United States Patent [19]

Hak

[11] Patent Number: 5,786,960
[45] Date of Patent: Jul. 28, 1998

[54] DEVICE FOR DISPLAYING THE ROTATING CONDITION OF TAPE OR DISK IN AUDIO OR VIDEO SYSTEMS

[75] Inventor: Kim Yong Hak, Inchon, Rep. of Korea

[73] Assignee: Clear Electronics, Inc., Seoul, Rep. of Korea

[21] Appl. No.: 782,572

[22] Filed: Jan. 10, 1997

[51] Int. Cl.⁶ ..................................................... G11B 5/008
[52] U.S. Cl. .............................................. 360/90; 360/137
[58] Field of Search .............................. 360/96.1, 96.6, 360/137, 90, 93, 97.01, 97.02; 369/75.1, 78, 79

[56] References Cited

U.S. PATENT DOCUMENTS

| | | | |
|---|---|---|---|
| 5,414,573 | 5/1995 | Koga | 360/96.5 |
| 5,432,660 | 7/1995 | Kono | 360/96.5 |

*Primary Examiner*—A. J. Heinz
*Attorney, Agent, or Firm*—Harrison & Egbert

[57] ABSTRACT

A device for displaying the rotating condition of a tape or disk in audio or video systems is disclosed. The display device has a rotary means, which is installed inside a housing of an audio or video system and is rotated synchronously with a tape feeding or disk rotating motion of the system. A transparent window is set on the housing at a position suitable for observing the rotary means from outside the housing. A guide tube extends from the window toward the rotary means and allows a user to observe a rotating motion of the rotary means through the transparent window and thereby to check the tape feeding or disk rotating motion of the system. The rotary means may be one of the rotating members of a power transmission mechanism of the system. Alternatively, the rotary means may be a rotating wheel operating in conjunction with the rotating members of a power transmission mechanism of the system.

3 Claims, 2 Drawing Sheets

DEVICE FOR DISPLAYING THE ROTATING CONDITION OF TAPE OR DISK IN AUDIO OR VIDEO SYSTEMS

BACKGROUND OF THE ART

1. Field of the Invention

The present invention relates, in general, to a device for displaying the rotating condition of a tape or disk in audio or video systems such as a cassette tape recorder, compact disk player or video tape recorder and, more particularly, to a structural improvement in such a device for allowing a user to easily check the rotating condition of a tape or disk in an audio or video system from outside the system while the system is operated in a tape or disk recording or playing mode and for giving a good appearance to the system.

2. Description of the Prior Art

As well known to those skilled in the art, an audio or video system such as a cassette tape recorder, compact disk player or video tape recorder records or plays back data on or from a tape or disk. In order to record or play back data on or from a tape or disk in an audio or video system, it is necessary to feed the tape or to rotate the disk in the system. A user of such a system may want to check the rotating condition of the tape or disk from outside the system while the system is operated in a data recording or playing mode. In an effort to meet the need for checking the rotating condition of the tape or disk, typical audio or video systems are provided with several types of displaying means such as an LED (light emitting diode), LCD (liquid crystal display) or transparent window. Particularly, the transparent window is preferably used with a cassette tape recorder.

However, the known LED does not display dynamically but shows statically the rotating condition of a tape or disk thus lacking vividness. The known LCD somewhat dynamically shows the rotating condition of a tape or disk in a system but fails to completely overcome the lacking of vividness. Another problem of the LCD resides in that the LCD is a barrier to the achievement of the recent trend of compactness of the system and fails to give a good appearance to the system.

SUMMARY OF THE INVENTION

It is, thus, an object of the present invention to provide a device for displaying the rotating condition of a tape or disk in audio or video systems in which the above problems can be overcome and which displays vividly the rotating condition of a tape or disk thus allowing a user to easily check the tape and disk rotating condition from outside an audio or video system while the system is operated in a tape or disk recording or playing mode and which allows the outer appearance of the system to be freely changed during a process of designing the audio or video systems.

In order to accomplish the above object, the present invention provides a device for displaying the rotating condition of a tape or disk in audio or video systems, comprising: rotary means installed inside a housing of an audio or video system and rotated synchronously with a tape feeding or disk rotating motion of the system; a transparent window set on the housing at a position suitable for observing the rotary means from outside the housing; and a guide tube extending from the window toward the rotary means and allowing a user to observe a rotating motion of the rotary means through the transparent window and thereby to check the tape feeding or disk rotating motion of the system.

The rotary means may be one of the rotating members of a power transmission mechanism of the system.

Alternatively, the rotary means may be a rotating wheel operating in conjunction with the rotating members of a power transmission mechanism of the system.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
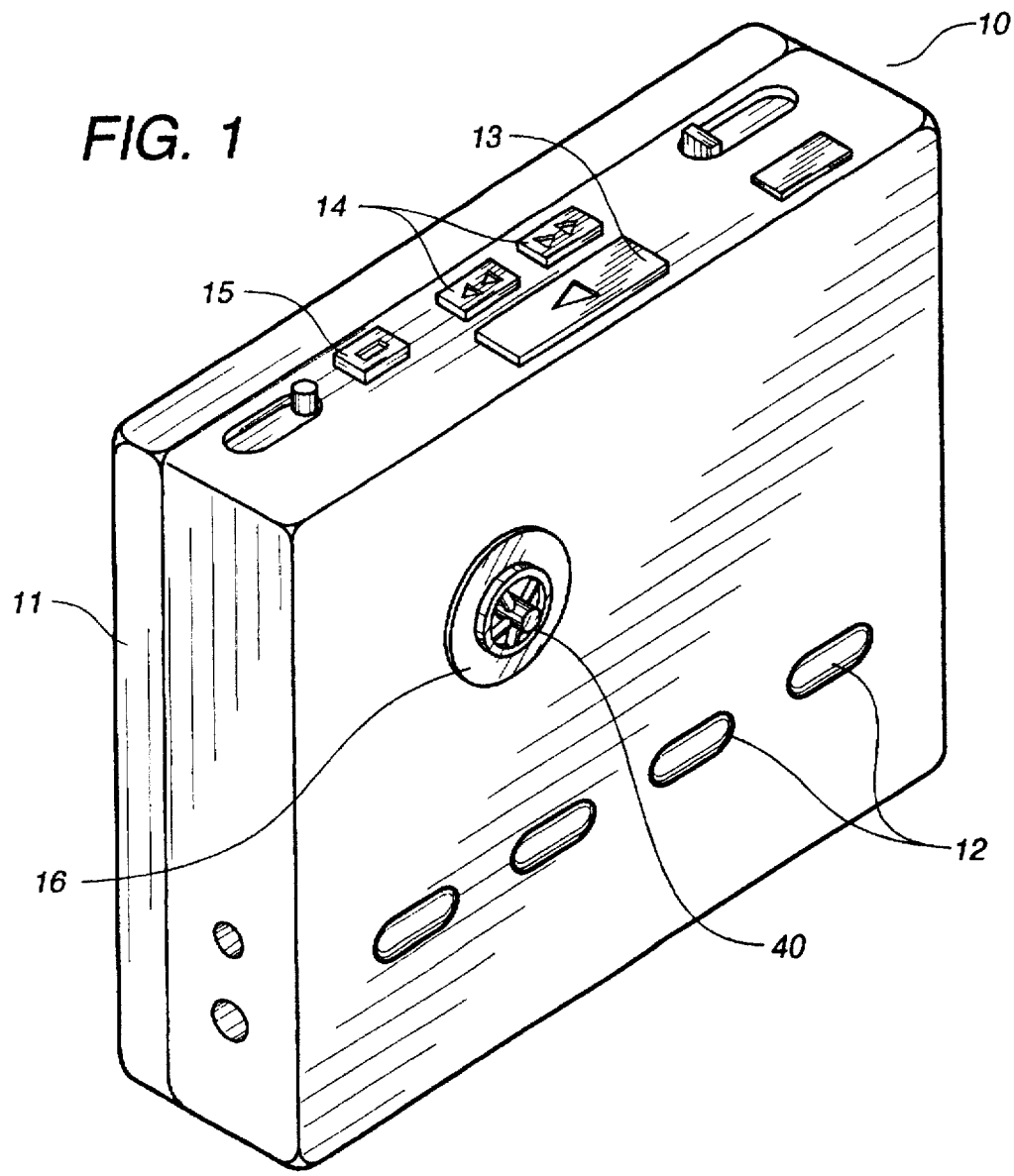
FIG. 1 is a perspective view showing the configuration of a cassette tape recorder provided with the rotating condition display device in accordance with preferred embodiment of the present invention.
Figure 2:
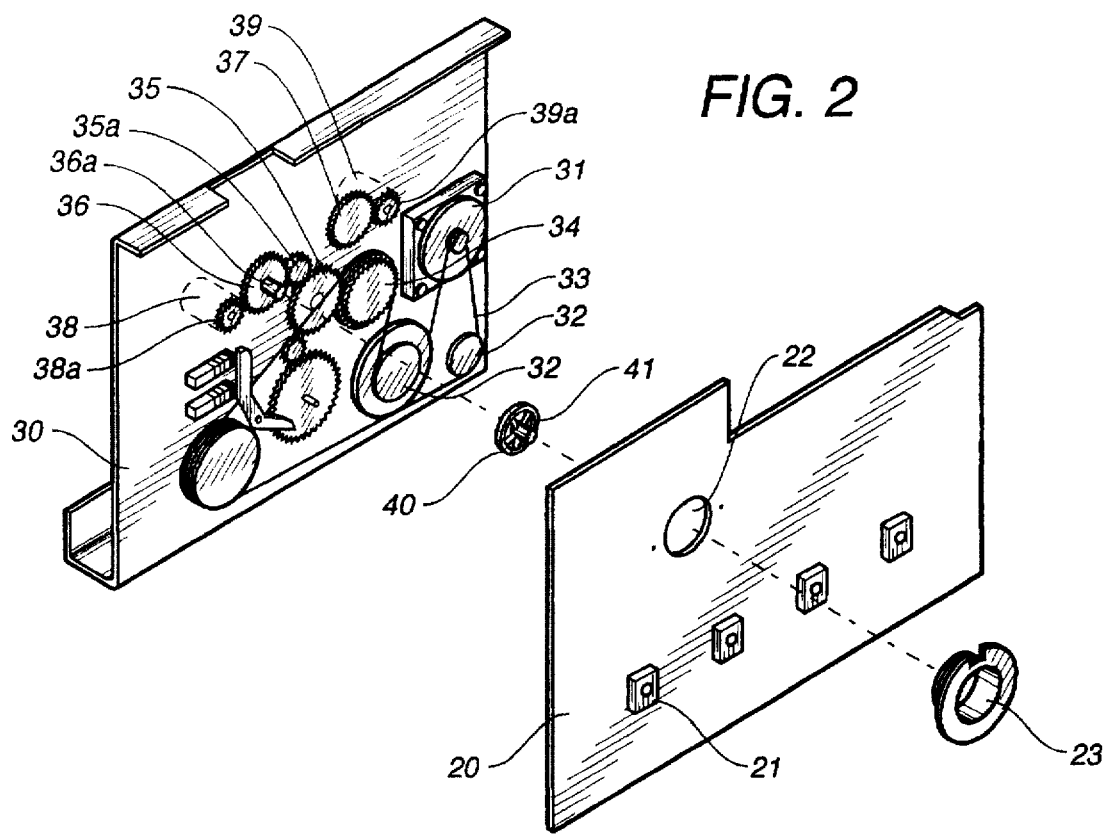
FIG. 2 is an exploded perspective view showing the construction of the display device of FIG. 1.
Figure 3:
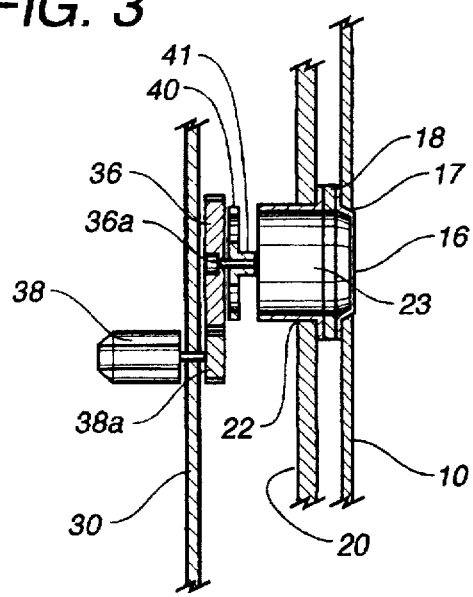
FIG. 3 is a sectional view of the display device of FIG. 1.

FIG. 1 is a perspective view showing the configuration of a cassette tape recorder provided with the rotating condition display device in accordance with the preferred embodiment of the present invention. FIG. 2 is an exploded perspective view showing the construction of the display device of FIG. 1. FIG. 3 is a sectional view of the display device of FIG. 1.

As shown in FIG. 1, the tape recorder is cased by a housing 10 having a rectangular cross-section. The tape recorder also includes a plurality of buttons, such as function select buttons 12, a play button 13, rewind and fast forward buttons 14 and a stop/eject button 15, which are provided on the housing 10. A tape insert door 11 is hinged to one side of the housing 10.

The display device of this invention comprises a rotary means, which is installed inside the housing 10 and is rotated synchronously with the tape feeding motion of a tape recorder. A transparent window 16 is set on the housing 10 at a position suitable for observing the rotary means from outside the housing 10. In the preferred embodiment, the rotary means comprises a rotating wheel 40, which is fitted over the rotating shaft 36a of a normal-directional drive gear 36 included in a power transmission gear train of the recorder. When the play button 13 is pushed down, the drive motor 31 is turned on and generates rotating force. The rotating force of the motor 31 is transmitted to the drive gear 36 through the power transmission gear train and in turn is transmitted to the take-up reel 38 which has a gear 38a gearing into the drive gear 36. The take-up reel 38 is thus rotated in the normal direction while taking up the tape, so that the magnetic head of the tape recorder plays back data from the tape.

As shown in FIG. 2, a PCB (printed circuit board) 20 and a mount panel 30 are installed inside the housing 10, with an outside gap being formed between the housing 10 and the PCB and an inside gap being formed between the PCB 20 and the panel 30. The PCB 20 has a plurality of function select switches 21 at positions corresponding to the function select buttons 12 of the housing 10. The motor 31 and a plurality of driven pulleys 32 are mounted to the panel 30. An endless belt 33 passes over the output shaft of the motor 31 and over all the driven pulleys 32, so that the rotating force of the motor 31 is transmitted to the driven pulleys 32 thus rotating the pulleys 32.

The power transmission gear train of the tape recorder comprises the following: One of the driven pulleys 32 is integrated with a main drive gear 34 into a single body. The above main drive gear 34 gears into a main driven gear 35. A movable connection gear 35a always gears into the main driven gear 34 and moves between two positions in accordance with a rotating direction of the main driven gear 34. That is, the connection gear 35a selectively gears into either of the normal and reverse-directional drive gears 36 and 37 in accordance with a rotating direction of the drive gear 34. The normal and reverse-directional drive gears 36 and 37 in turn gear into normal and reverse-directional driven gears 38a and 39a, respectively. The normal-directional driven gear 38a is integrated with the take-up reel 38, while the reverse-directional driven gear 39a is integrated with a tape supply reel 39. The two reels 38 and 39 project on the opposite side of the mount panel 30.

In the preferred embodiment, the boss 41 of the rotating wheel 40 is tightly fitted over the rotating shaft 36a of the normal-directional drive gear 36, so that the wheel 40 can be rotated synchronously with the rotating motion of the normal-directional drive gear 36. A first circular opening 22 is formed on the PCB 20 at a position corresponding to the rotating wheel 40, while a second circular opening 17 is formed on the housing 10 at a position aligned with the first opening 22 of the PCB 20. The transparent window 16 is set in the second opening 17 of the housing 10. Fitted into the first opening 22 of the PCB 20 is a flanged guide hollow tube 23, which extends toward the rotating wheel 40 and allows a user to see the rotating wheel 40 from outside the housing 10. An annular packing 18 is water-tightly interposed between the window 16 and the flanged end of the guide tube 23.

In the present invention, the rotary means is installed inside the housing 10 and is rotated synchronously with a tape feeding motion of the tape recorder, while the transparent window 16 is set on the housing 10 at a position suitable for observing the rotary means from outside the housing 10. Thus, it is possible for a user to check the tape feeding condition from outside the housing 10 during a playing mode of the tape recorder. In accordance with the preferred embodiment of this invention, the rotary means comprises the rotating wheel 40, which is fitted over the rotating shaft 36a of the normal-directional drive gear 36 included in the power transmission gear train of the tape recorder. However, it should be understood that the rotary means of the display device may comprise one of the existing gears, for example, the normal-directional drive gear 36 in place of the above-mentioned wheel 40 without affecting the functioning of this invention. When the play button 13 of the housing 10 is pushed down, the drive motor 31 of the mount panel 30 is turned on and generates rotating force. The rotating force of the motor 31 is transmitted to the driven pulleys 32 and to the main drive gear 34 through the endless belt 33.

Thus, the main drive gear 34 rotates the main driven gear 35. The movable connection gear 35a in the above state moves to the left in FIG. 2 thus being brought into engagement with the normal-directional drive gear 36. Therefore, the rotating force of the motor 31 is transmitted to the take-up reel 38 through the normal-directional drive and driven gears 36 and 38a. The take-up reel 38 is thus rotated in the normal direction while taking up the tape, so that the magnetic head of the tape recorder plays back data from the tape.

When the normal-directional drive gear 36 is rotated as described above, the rotating wheel 40, which is fitted over the shaft 36a of the gear 36, is rotated in the same direction.

The rotating motion of the wheel 40 can be observed by a user through the transparent window 16 and the guide tube 23, so that the user can easily check the tape feeding motion from outside the housing 10 while the tape recorder is operated in a tape playing mode.

As described above, the present invention provides a device for displaying the rotating condition of a tape or disk in audio or video systems such as a cassette tape recorder, compact disk player or video tape recorder. The display device comprises a rotary means, which is installed inside the housing of an audio or video system and is rotated synchronously with a tape feeding or disk rotating motion of the system. A transparent window is set on the housing at a position suitable for observing the rotary means from outside the housing. In the preferred embodiment, the rotary means comprises a rotating wheel, which is fitted over the rotating shaft of a normal-directional drive gear included in a power transmission gear train of a tape recorder. When the play button of the tape recorder is pushed down, a drive motor generates rotating force. The rotating force of the motor is transmitted to the normal-directional drive gear through the power transmission gear train, thus rotating the take-up reel. The take-up reel thus takes up the tape, so that the magnetic head of the tape recorder plays back data from the tape. In this case, the rotating motion of the rotary wheel, which is rotated synchronously with the normal-directional drive gear, can be observed by a user through the transparent window and the guide tube, so that the user can easily check the tape feeding motion from outside the housing while the tape recorder is operated in a tape playing mode.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, in the preferred embodiment, the rotating condition display device of this invention is used with a tape recorder. However, it should be under stood that the display device may be used with another system such as a compact disk player or video tape recorder without affecting the functioning of this invention.

What is claimed is:

1. A device for displaying the rotating condition of a tape or disk in audio or video systems, comprising:

rotary means installed inside a housing of an audio or video system and rotated synchronously with a tape feeding or disk rotating motion of the system;

a transparent window set on said housing at a position suitable for observing said rotary means from outside the housing; and a guide tube extending from the window toward said rotary means and allowing a user to observe a rotating motion of said rotary means through the transparent window and thereby to check the tape feeding or disk rotating motion of the system.

2. The device according to claim 1, wherein said rotary means is one of rotating members of a power transmission mechanism of said system.

3. The device according to claim 1, wherein said rotary means is a rotating wheel operating in conjunction with rotating members of a power transmission mechanism of said system.

* * * * *